Sept. 22, 1964     R. L. HORST     3,149,650
ADMITTANCE METER AND DIELECTRIC CONTROL SYSTEM
Filed Aug. 30, 1960     5 Sheets-Sheet 1

INVENTOR

Robert L. Horst

BY  *Moore & Hall*

ATTORNEYS

Sept. 22, 1964      R. L. HORST      3,149,650
ADMITTANCE METER AND DIELECTRIC CONTROL SYSTEM
Filed Aug. 30, 1960      5 Sheets-Sheet 2
FIG. 3.
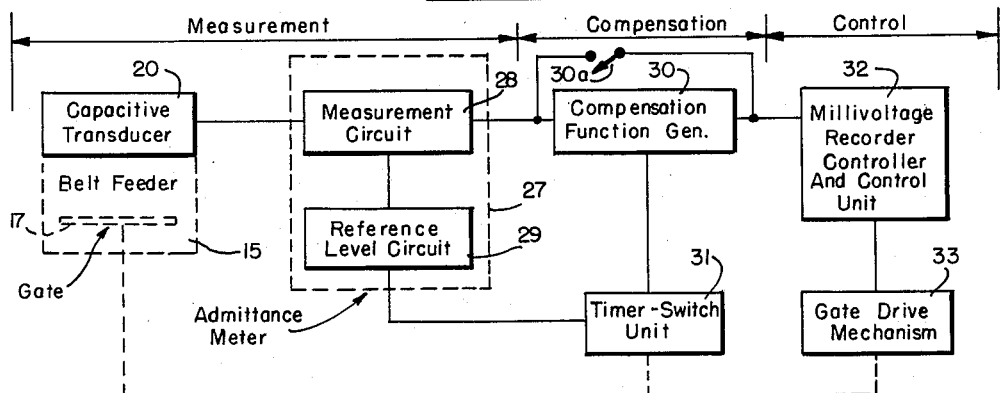
FIG. 6A.
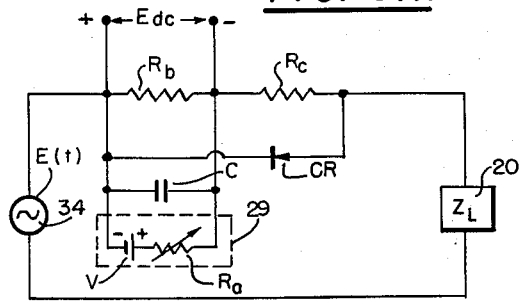
FIG. 6B.
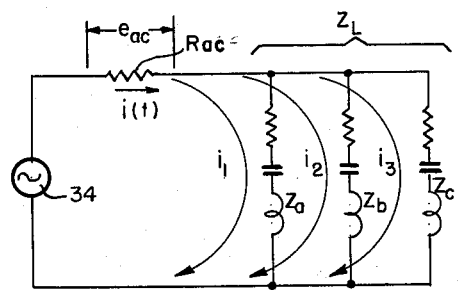
FIG. 7.
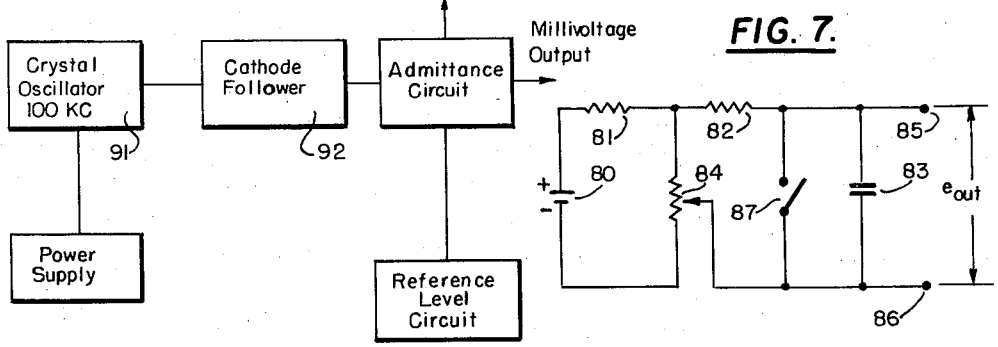
FIG. 8.
INVENTOR
Robert L. Horst
BY    Moore & Hall
ATTORNEYS

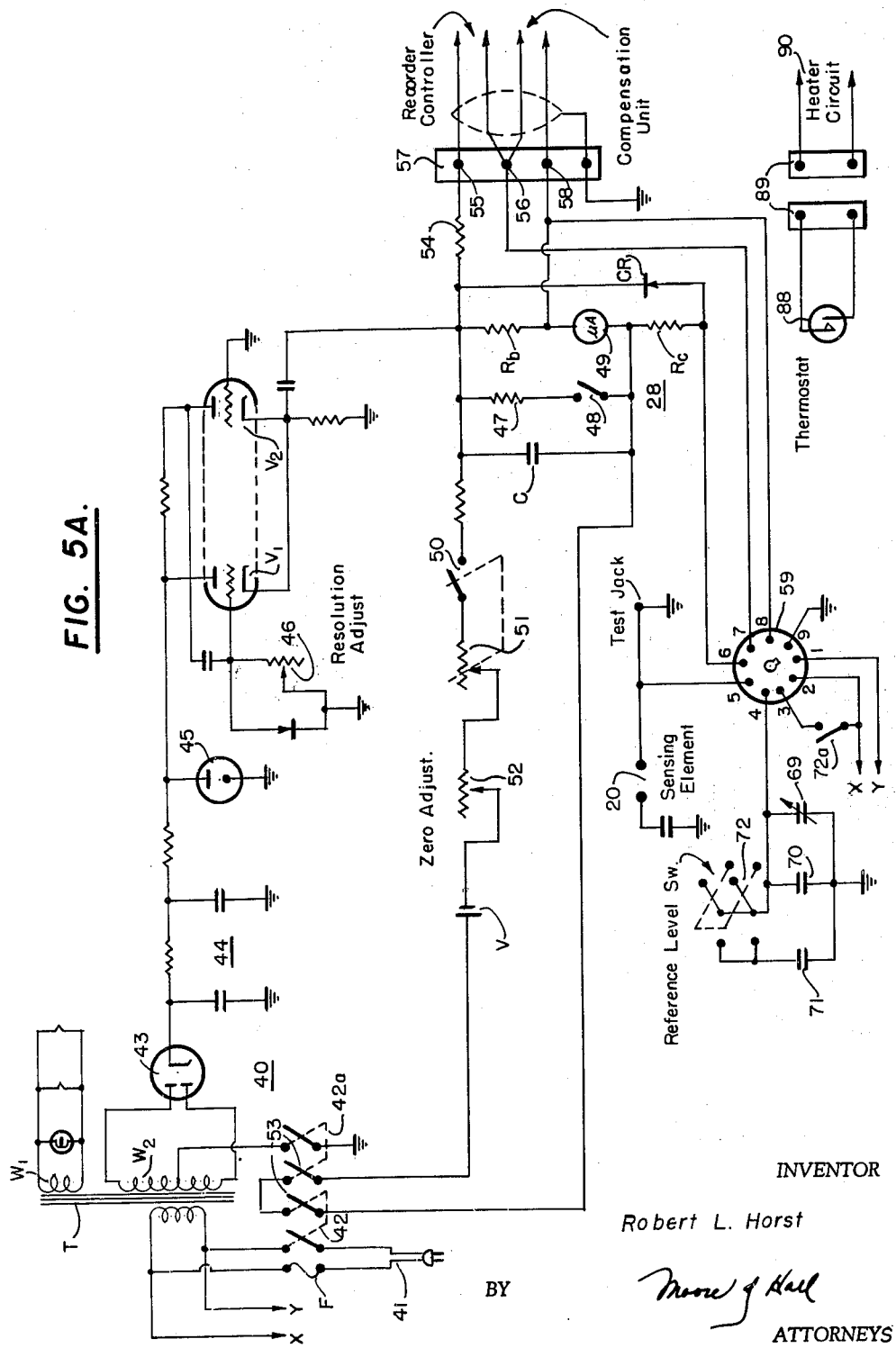

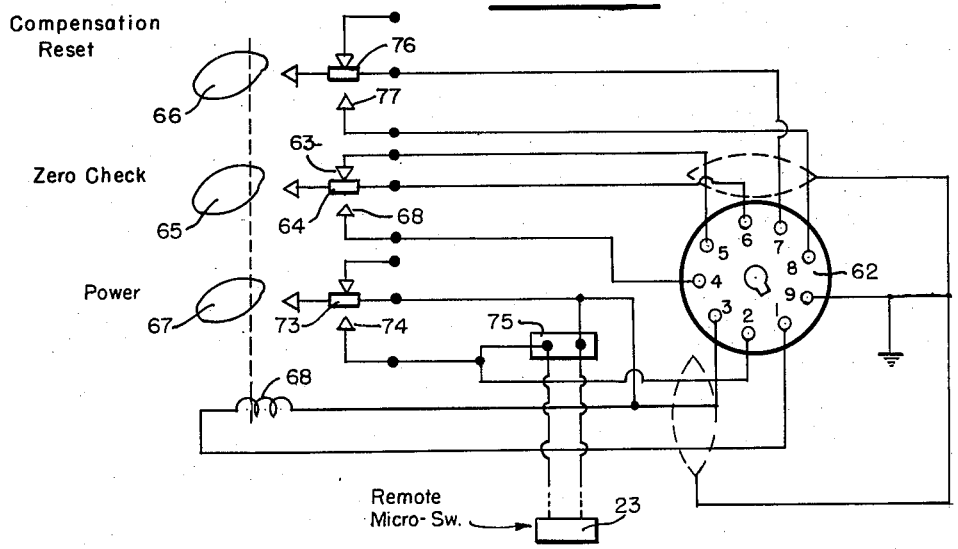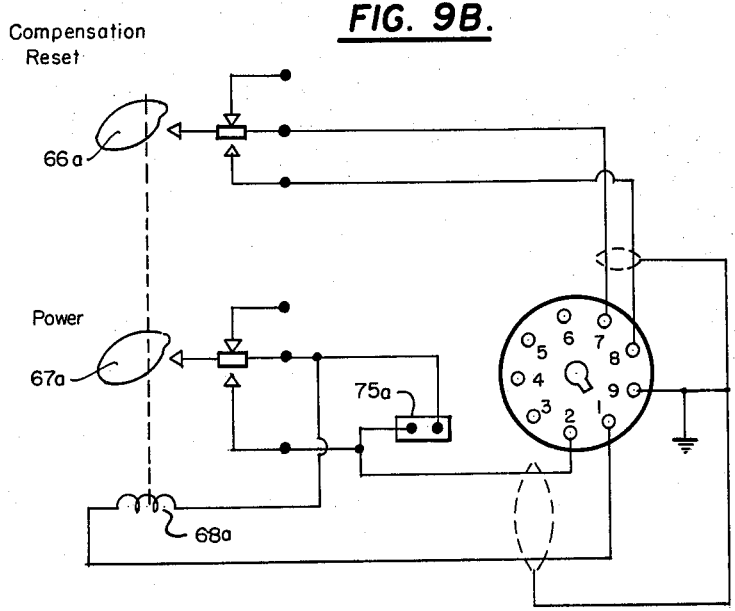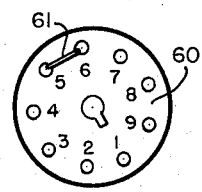

Sept. 22, 1964 R. L. HORST 3,149,650
ADMITTANCE METER AND DIELECTRIC CONTROL SYSTEM
Filed Aug. 30, 1960 5 Sheets-Sheet 5

INVENTOR
Robert L. Horst
BY
Moore & Hall
ATTORNEYS

United States Patent Office 3,149,650
Patented Sept. 22, 1964

3,149,650
ADMITTANCE METER AND DIELECTRIC
CONTROL SYSTEM
Robert L. Horst, Mountville, Pa., assignor to Armstrong
Cork Company, Lancaster, Pa., a corporation of
Pennsylvania
Filed Aug. 30, 1960, Ser. No. 52,932
21 Claims. (Cl. 141—361)

The present invention is concerned with the provision of an improved admittance meter capable of employment in various measurement and control processes wherein the primary variable is a determinable function of dielectric constant; and is more particularly concerned with a control arrangement of the type described utilized in a feeding system wherein dynamic level control of a flowing dielectric material is effected.

As will be discussed hereinafter, the admittance meter of the present invention comprises a circuit arrangement adapted to determine the dielectric constant of a dielectric material, and is readily adaptable to dielectric measurement in diverse areas so long as a process medium, or test specimen in the case of laboratory application, be a dielectric or artificial dielectric material. In this respect, therefore, the system may be employed wherever the primary variable is a determinable function of dielectric constant, e.g. moisture content, density, thickness, liquid level, product composition, or the like; but the system has been found to exhibit particular utility in the measurement and control of the dielectric constant of granular materials and the like, such as may be employed in the manufacture of artificial dielectric materials, e.g. aluminum-sliver loaded expanded polystyrene, constituting Luneberg lens media.

In order that the foregoing application of the system to be described hereinafter may be more fully appreciated, it should be noted that it is well known at the present time to provide lens or antenna systems, generally termed microwave lenses, radio frequency lenses, lens antennas, etc., for use in microwave optics. One such microwave lens is known as the Luneberg lens; and this lens is characteristically a spherically symmetric refracting device comprising an artificial dielectric material (i.e. a composite material which simulates an actual dielectric in its effect on electromagnetic radiation) wherein a variable dielectric constant exhibited by said material in the overall lens operates to focus an incident plane electromagnetic wave to a point on its surface, or conversely produces a plane wave from a point source on the focal sphere. Such a lens, as well as other microwave lenses capable of employment with the materials to be described hereinafter, is well known to those skilled in the art, and is described in much published literature, a typical publication being "Designing Dielectric Microwave Lenses" by K. S. Kelleher, Electronics, June 1956, pages 138 et seq.

In the fabrication of such microwave lenses, and in the processing of artificial dielectric materials for use in the assembly of such lenses, it is desired to fabricate lens units of artificial dielectric material, with each such unit exhibiting a uniform dielectric constant within precise limits. By way of example, the process of the present invention, to be described hereinafter, can be employed in the fabrication of dielectrically uniform and stable 24-inch cubes of artificial dielectric material; and such cubes are ultimately assembled into a much larger unit, constituting the completed lens, a typical lens employing for example in the order of 40,000 such units in assembled relation.

It becomes extremely important in the fabrication of such lenses to assure that the dielectric constant of each such cube or unit is maintained within precise tolerances; and the dielectric constant of different such cubes may individually differ from one another, again within precise tolerances, whereby assembly of such cubes, in accordance with their particular individual dielectric constants, ultimately produces a final lens which has a desired dielectric gradient therein across the lens. The achieving of stable and precisely accurate dielectric constants for each individual unit becomes, therefore, most important in assuring that the ultimate lens functions properly; and the present invention is accordingly concerned with an arrangement for processing artificial dielectric materials in such manner that the constant dielectric properties of such individual units may be achieved to greater tolerances than have been possible heretofore.

A typical artificial dielectric material of the type which may be employed in the fabrication of lens media units constitutes polystyrene beads having a diameter in the order of ⅛-inch, and having a dielectric constant substantially equal to unity. A mass of such beads may be interspersed with flakes or slivers of aluminum whereby the composite mass exhibits a dielectric constant greater than unity. In prior manufacturing techniques utilized to fabricate such an artificial dielectric unit, it has been suggested that the polystyrene beads be weighed, that the slivers be weighed, and that the sliver size be controlled, whereafter weighed quantities of beads and controlled-size slivers are batch-mixed and utilized to charge a mold functioning to cohere the mass into a unit of the type desired. These weighing and batch-mixing techniques have been found to produce relatively inaccurate results in the final product; and the Kelleher article mentioned previously particularly states that various samples of artificial dielectric material may have a variation in dielectric constant of at least 3% whereby the desired refractive index of the final lens may deviate substantially from that desired. The present invention serves to fabricate a far more accurate and uniform dielectric constant material than has been possible heretofore; and in effecting this purpose utilizes a highly improved control feeding arrangement incorporating the improved admittance meter of the present invention.

In particular, and as will be described hereinafter, the fabrication techniques of the present invention employ a continuous and direct reading process measurement and control system utilized to produce dielectric and artificial dielectric materials over a range of dielectric constant from 1.00 to 2.00, and adapted further to be utilized at higher values of dielectric constant. Dielectric measurement of a flowing granular artificial dielectric material is accomplished by means of a continuous electrical admittance measurement employing an appropriate capacitive transducer through which the process material passes. A closed loop regulating control system (as distinguished from a servo-mechanism) causes depth adjustments of the artificial dielectric media as it issues between the plates of said capacitive transducer (constituting, as will be described, a vertical-parallel plate capacitive sensing element) in order to correct for dielectric non-uniformities which may occur in the media. The medium so controlled preferably has a dielectric constant greater than that desired in the final unit; and said medium is diluted by a similar material of near-unity dielectric constant which is cross-fed with the controlled medium in order to obtain a controlled final product.

The dielectric characteristics of the material flowing through the parallel plate capacitor in turn control the electrical capacitance of said capacitor; and said capacitor or transducer is coupled to a novel admittance measurement circuit operative to effect an accurate relative measurement of the change in electrical capacitance of said transducer above $C_0$ (transducer capacitance in air). As a result, the admittance measurement circuit effects an output which is by definition a measure of the change in dielectric constant of the flowing media. This output from the admittance measurement circuit is in turn coupled to a control portion of the system constituting commercially available equipment such as will be described; and this control equipment is ultimately tied to a feeder gate mechanism adapted to effect adjustments in depth of the flowing media being controlled, thereby to effect desired control of the final product. The flowing media thus controlled is fed into a mold charging box without disturbing the mix, whereafter the mix is molded by a low pressure steam cycle to produce the cubic subunit described previously.

During the aforementioned molding cycle the originally uniform dielectric material may assume a non-uniform dielectric constant from top to bottom of the mold charge box, as a result of temperature gradients produced across the box during the molding step. In this respect, it should be noted that such temperature gradients may change the density of portions of the polystyrene charge, and thereby also change the metallic obstacle concentration in the blend. A non-uniform dielectric constant, or dielectric gradients, may thus result from the molding step even though uniform gradient material is charged into the box.

Accordingly, in accordance with a further aspect of the present invention, the control circuitry of the present invention is designed to provide, when desired, a controlled programming of the dielectric constant of material being fed into the charge box thereby to charge a non-uniform dielectric mass into the box which is adapted to offset the molding change so as to result finally in a uniform dielectric constant block. Indeed, as will become apparent from the subsequent description, this compensation apparatus can further be employed in conjunction with other of the circuit elements to be described hereinafter to produce any desired dielectric gradient within a final molded unit of dielectric material whereby the system can in fact be employed to produce a final assembled mass of material having a uniform smoothly varying gradient therein as opposed to the stepped gradient devices which are characteristic of the prior art wherein plural uniform dielectric constant blocks are assembled.

The per unit measurement resolution effected by the system to be described is highest for low values of dielectric constant, and in the particular embodiment to be described, is 11.6 millivolts per unit. Where the measured parameter is very nearly a pure capacitance, the resolution may be expressed in capacitive units, and as such is 0.4 millivolt per micromicrofarad, although higher resolutions are possible by simple electrical adjustment. The arrangement thus provided, in conjunction with the closed loop regulating control system of the present invention, allows continuous fabrication of composite dielectric materials to second decimal accuracy with a standard deviation of approximately 0.005; and this represents a most significant improvement over the minimum 3% deviations which have been discussed heretofore.

It is accordingly an object of the present invention to provide an improved admittance meter adapted to be utilized in measurement and process control installations wherein a parameter being measured is a determinable function of dielectric constant.

A further object of the present invention resides in the provision of an improved control system wherein dynamic control of a flowing granular or other dielectric material is effected, particularly through level control of said material.

A still further object of the present invention resides in the provision of an improved measurement and control apparatus adapted to effect process control of dielectric materials within far greater tolerances than have been possible heretofore.

A stil further object of the present invention resides in the provision of a novel control system adapted to effect accurate control of the dielectric constant of a dielectric material being fabricated; and also adapted to effect continuous adjustment of the control variable in such manner that a planned dielectric variation may be programmed into a unit being fabricated when desired.

A still further object of the present invention resides in the provision of an improved continuous and direct reading process measurement and control system utilizing the permittivity or dielectric constant of a process material as the primary control parameter.

A still further object of the present invention resides in the provision of an improved admittance measurement circuit capable of utilization per se, or as an element of a process control arrangement.

The foregoing objects, advantages, construction and operation of the present invention will become more readily apparent from the following description and accompanying drawings in which:

FIGURE 3 is a block diagram of the control circuit employed in the arrangement of FIGURE 1.

Figure 4:
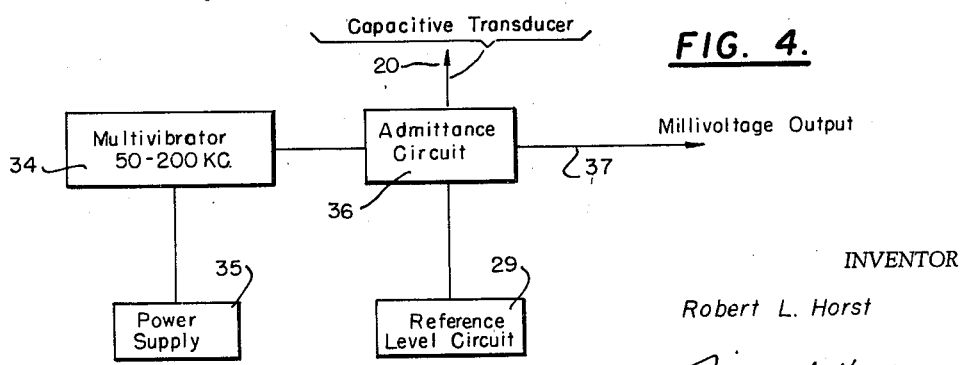
FIGURE 4 is a further block diagram showing one embodiment of the admittance meter portion of the circuit shown in FIGURE 3.

FIGURES 5A, 5B and 5C schematically illustrate the circuit of FIGURE 3 employing the admittance meter arrangement of FIGURE 4.

FIGURES 6A and 6B are circuit and equivalent circuit diagrams respectively of the admittance measurement portion of the circuit shown in FIGURE 5A.

FIGURE 7 is an illustrative schematic diagram of a function generator such as may be employed in the arrangement of FIGURE 3.

Figure 9A:
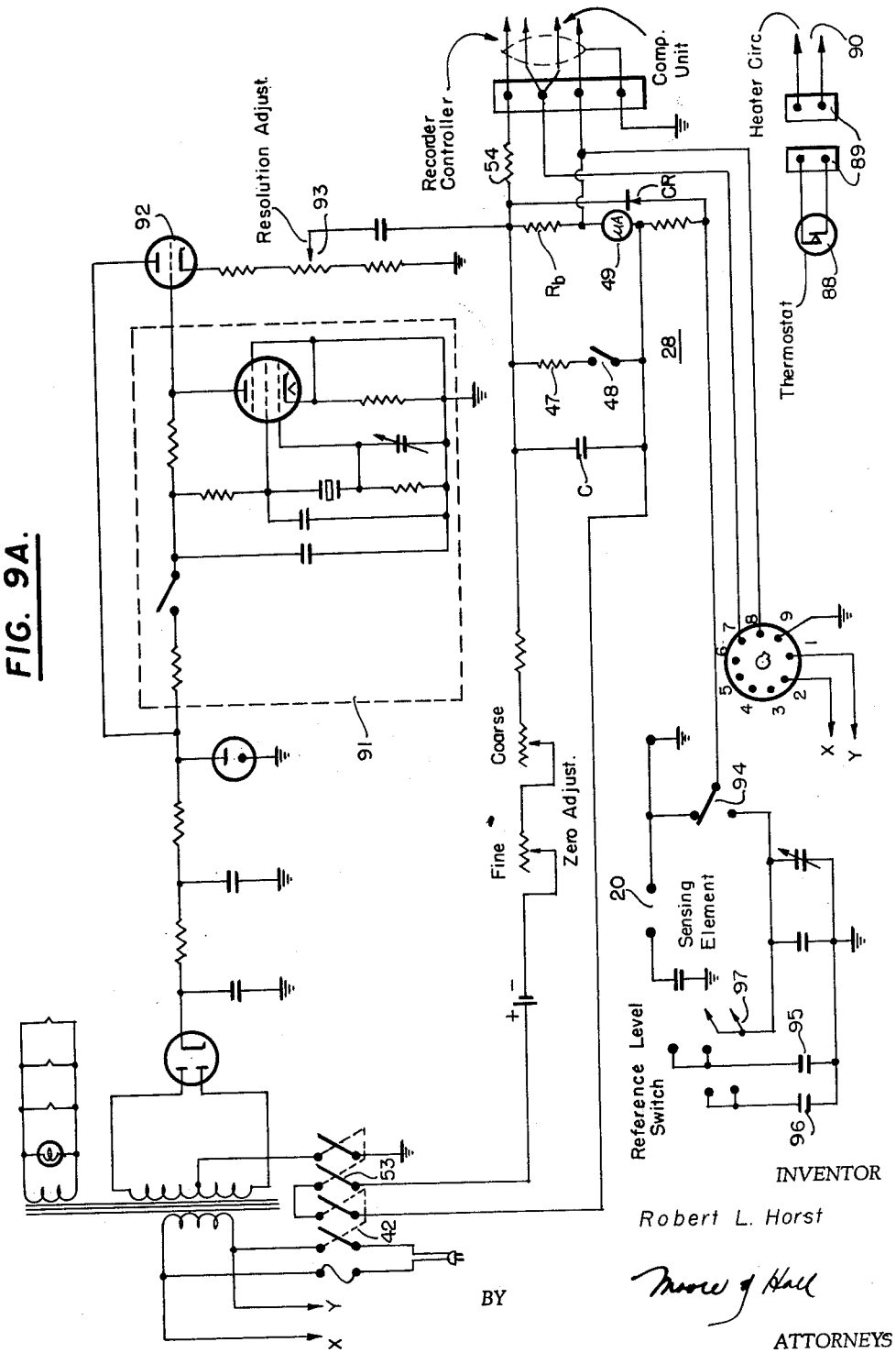

FIGURE 8 is a block diagram showing another embodiment of the admittance meter circuit which may be employed in the arrangement of FIGURE 3; and FIGURES 9A and 9B schematically illustrate the circuit of FIGURE 3 employing the alternative admittance meter arrangement of FIGURE 8.

Figure 1:
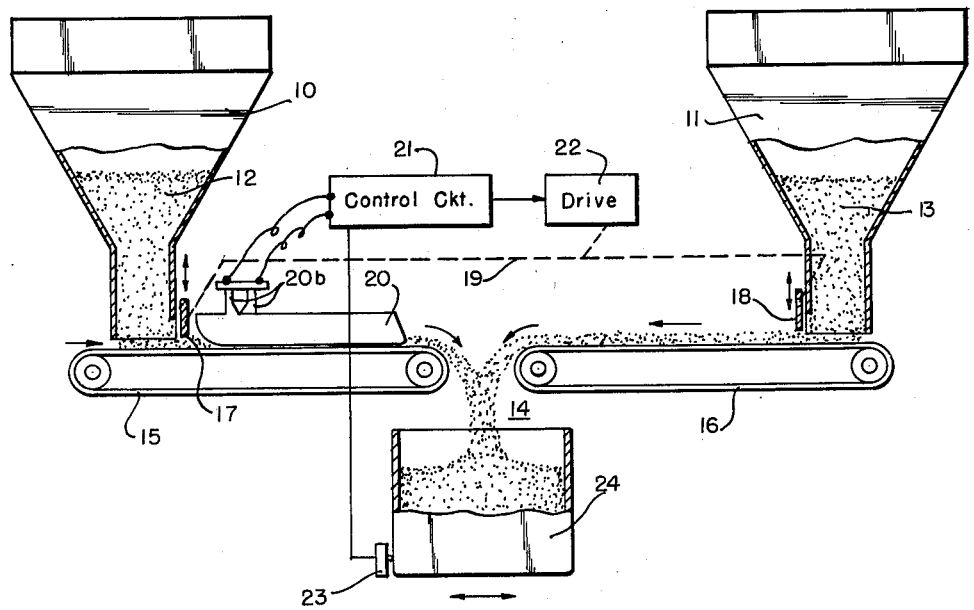
FIGURE 1 is a schematic illustration of the feeder equipment and associated control elements which may be employed in accordance with the present invention.

Referring now to FIGURE 1, it will be noted that the feeding and control system employed in the production of aluminum sliver loaded polystyrene foam, adapted for the microwave lens utilization already discussed, may take the form of a blend feeder employing a dilution technique which is particularly desirable to achieve maximum uniformity of dielectric constant in a final mix. In particular, the system may comprise a pair of hoppers 10 and 11, with hopper 10 containing a premixed blend 12 of polystyrene beads and aluminum slivers, having a dielectric constant greater than one and in excess of that desired in the final product. Hopper 11 in turn contains a diluent 13 comprising only polystyrene beads identical in all respects to those which serve as a vehicle for the aluminum slivers in blend 12, but having a dielectric constant lower than that desired in the final product, i.e. a dielectric constant of substantially unity. The bead-sliver blend 12 is fed toward a central discharge point 14 along a conveyor 15, while the polystyrene bead diluent 13 is similarly fed toward said central discharge point 14 along a further conveyor 16.

A pair of gates 17 and 18 are provided adjacent the discharge ends of hoppers 10 and 11 respectively; and said feeder gates 17, 18 are connected to one another by a linkage 19 so arranged that as either of said gates moves upward, the other of said gates moves downward by a related amount to effect a combined volume output along conveyors 15 and 16 at discharge point 14 which is substantially constant in volume and completely independent of individual gate positioning. Hence the relatively high dielectric constant material 12, cross fed with the relatively low dielectric constant material 13, is combined at discharge point 14 to provide a diluted dielectric material of constant volumetric flow but having a dielectric constant determined by the position of gate 17, i.e. by the relative quantity of blend 12 which appears in the constant volume of flow at point 14.

It is at this point that the measurement and control system of the present invention is particularly utilized; and the controlled variable, i.e. the dielectric constant of the final mix at discharge point 14, is automatically adjusted by gate variation of the relative volumes; and more specifically by control of the relative depths of the cross fed materials on conveyors 15 and 16. Complete dielectric sensing and control may be obtained by utilization of an integrated sensing system employing transducers along both feeders or conveyors 15 and 16, or by measurement of the feeder system combined output at discharge point 14. In the particular arrangement illustrated, however, detection of only the blend passing along belt 15 is effected; and inasmuch as the dielectric constant of the diluting material 13 is very nearly unity, little error is introduced by measurement of only this bead-sliver blend.

The measurement and control portion of the total system (see FIGURES 1 and 2) comprises in essence a parallel plate capacitive sensing device 20 and a control circuit 21 coupled thereto and including an admittance measurement instrument producing an output ultimately controlling a drive mechanism 22 which is coupled to the aforementioned feeder gate linkage 19. The control circuit 21 may be further controlled by a microswitch 23 positioned adjacent the charge receiving box 24 into which the combined materials flowing at discharge point 14 are loaded; and switch 23 is used to automatically start and stop operation of the feeding and control mechanism, when desired, as a result of the movement of filled boxes 24 away from discharge point 14 and substitution of empty such boxes for a further filling operation. Such control by switch 23 will be described in greater detail hereinafter.

Figure 2:
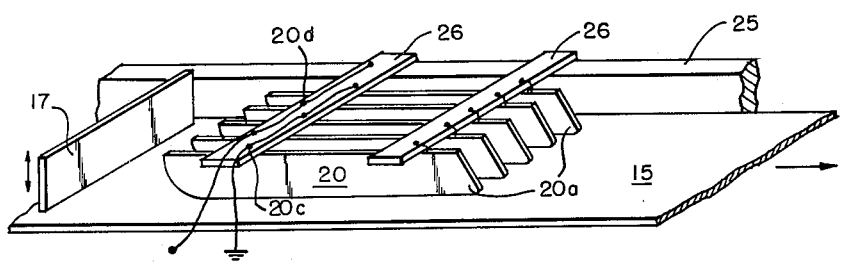
FIGURE 2 is a perspective illustrative view of a transducer, feeder, and feeder gate arrangement of the type employed for dynamic level control of a flowing medium in accordance with the present invention.

The capacitive transducer 20 is located downstream of the gate 17 and comprises essentially a seven-plate capacitor, with five of the plates $20_a$ being removably disposed between feeder side walls 25 (only one of which is shown in FIGURE 2, and neither of which is shown in FIGURE 1, for clarity), said feeder side walls serving as the two outside plates of the transducer. The plate separation between the several plates $20_a$ and 25 is substantially three inches, and the removable elements are positioned approximately ⅛ inch above feeder belt or conveyor 15. The several plates $20_a$ are streamlined to provide minimum flow disturbance and to prevent raw material buildup; and the leading edges of said plates are parabolically contoured while the bottom edge has a slight upward slope, these considerations having been found in practice to facilitate the flow of granular dielectric material, such as is here involved, between the several plates and toward discharge point 14. Alternate ones of said plates $20_a$ and feeder side walls 25 are electrically interconnected to one another by alternately disposed plate projections $20_b$ (see FIGURE 1) associated with different ones of said plates $20_a$ and coupled to interconnected terminals $20_c$ and $20_d$ carried by polystyrene supports 26.

During system operation, the transducer 20 is partially filled, whereby its total capacitance becomes a function of the blend depth and its dielectric constant; and for a given depth of material, a capacitance change results from an incremental change in dielectric constant of the medium between plates $20_a$ which is a linear function of that incremental change. This condition is accordingly sufficient to allow determination of sliver concentration inconsistencies by direct measurement of changes in the electrical capacitance of the transducer 20; and such capacitance measurement is accomplished through use of the admittance measurement instruments to be described hereinafter, two embodiments of which are depicted in FIGURES 5A through 5C, and FIGURES 9A, 9B respectively.

The control circuit and drive arrangement, constituting blocks 21 and 22 in FIGURE 1, are more particularly illustrated in FIGURE 3; and as will be noted from FIGURE 3, the over-all circuit may be broadly broken down into three sections performing the functions respectively of measurement, compensation (when desired) and control. The over-all arrangement includes a capacitive transducer 20 mounted on the belt feeder 15 and cooperating with a gate 17, as already described. Capacitive transducer 20 and its associated gate 17 is of course employed to effect dynamic level control of the flowing material. Transducer 20 is in turn coupled to an admittance meter 27 which includes a measurement circuit 28 adapted to determine the impedance or admittance of the transducer-dielectric fill combination; and adapted further to give an output characteristic of this admittance measurement. The measurement circuit 28 is further associated with a zero reference or reference level circuit 29 operative to calibrate the measurement circuit 28 in a process control system of the type here involved but otherwise optional when the admittance meter 27 is to be employed as a general purpose instrument adapted to effect admittance measurement wtihout regard to the present control system.

The output of measurement circuit 28 is combined with the output of a compensation function generator 30 which serves to add a programming signal to the measurement circuit output when it is desired to effect a controlled change in the dielectric mix appearing at discharge point 14, either to compensate for dielectric gradients otherwise effected during the molding operation, or to produce a controlled dielectric gradient in the final product, as desired. The compensation function generator 30 and reference level circuit 29 (when they are employed) may be further controlled by a timer switch unit 31; and the timer switch unit 31, as will be described, in effect takes the form of a reset mechanism adapted, in conjunction with reference level circuit 29, to permit periodic checks of the instrument calibration; and also adapted in conjunction with function generator 30 to restart the compensation program after a given unit of blend has been fed and loaded into a box such as 24.

The combined output of measurement circuit 28 and compensation function generator 30 is coupled to a control system comprising a millivoltage recorder controller and control unit 32 in conjunction with a gate drive mechanism 33 serving to position linkage 19. The units 32 and 33 are commercially available and, except for minor modifications, are installed and interconnected in conventional manner. In particular, unit 32 comprises a Leeds and Northrup Series G millivolt recorder interconnected to a Leeds and Northrup Series 60 control unit; while unit 33 may comprise a Leeds and Northrup electric drive mechanism Series 10260.

The unit 32 operates to provide a reference signal corresponding to the desired dielectric constant of flowing material, said reference signal being settable on a master slide wire contained in the unit. This reference signal provided in unit 32 is compared with the output of measurement circuit 28, or with the combined outputs of circuits 28 and 30, when the latter is provided, to give an error signal controlling the drive unit 33 and said drive unit 33 in turn includes a slave slide wire mechanism (which, for mechanical considerations, is preferably relocated external of the commercial unit 33 identified above), said slave slide wire cooperating with the master slide wire in unit 32 in a manner characteristic of the commercially available equipments mentioned. Control may be established at any millivoltage value over the zero to five millivolt range of equipment 32; but the reference level circuit 29, as will be described hereinafter, may be provided with switching mechanisms adapted to allow range extension as may be required.

One arrangement for the admittance meter 27, comprising measurement circuit 28 and reference level circuit 29 (see FIGURE 3), is more particularly depicted in further block diagrammatic form in FIGURE 4. The circuit may utilize a multivibrator 34 energized by a power supply 35 and acting as an input source to an admittance circuit 36, a portion of which includes the capacitive transducer 20 already mentioned. A reference level circuit 29 is also coupled to said admittance circuit, for purposes to be described hereinafter; and the overall arrangement produces an output on line 37 which may be coupled directly to the recorder controller and control unit 32, or which may be combined with the output of function generator 30 and then so coupled.

Before proceeding with a detailed discussion of the schematic equivalent of the circuit shown in FIGURE 4 (i.e. the circuits shown in FIGURES 5A through 5C inclusive), reference will first be made to FIGURES 6A and 6B which illustrate in somewhat greater detail the concept of admittance measurement employed in the present invention, as well as significant elements of the admittance circuit 36. Thus, referring to FIGURES 6A and 6B, it will be seen that the admittance measurement circuit may include a pair of resistors $R_b$ and $R_c$ connected in series with one another and with a load $Z_L$ across a source of alternating or pulsating voltage $E(t)$. When the arrangement of FIGURE 6A is related to that of FIGURE 4, it will be noted that the source $E_t$ corresponds to the multivibrator 34, although as will become apparent from the discussion with reference to FIGURES 8 and 9, said source may also take the form of a crystal controlled oscillator. The impedance $Z_L$ in turn comprises the aforementioned capacitive transducer 20, whereby it represents a variable impedance the magnitude of which depends upon the level of flowing granular material between the plates thereof. The series-parallel network comprising $R_b$, C, and $R_c$ serves to develop a voltage thereacross for purposes of rectification by a diode CR the magnitude of which voltage, it will be noted, varies with variations in impedance $Z_L$, i.e. transducer 20; and resistor $R_b$ is in turn provided to develop the rectified voltage provided by CR.

Resistor $R_b$ is necessarily small (less than a few thousand ohms) due to the source impedance requirement of the associated recording and control equipment; and is provided in conjunction with rectifier CR essentially to provide a low impedance D.C. input such as is required by the commercially available control equipment described previously. Resistor $R_b$ is shunted by a capacitor C acting essentially as a filter operative to remove ripple from the meter circuit; and said resistor $R_b$ is further shunted by the zero reference circuit 29 comprising in its simplified form shown in FIGURE 6A a source of voltage V and a variable resistance $R_a$.

The circuit of FIGURE 6A may be analyzed by the equivalent circuit shown in FIGURE 6B; and for the purpose of this analysis we will initially neglect the zero refernce level components V and $R_a$ ($R_a$ being much greater than the capacitive reactance of capacitor C), and we will further initially ignore the crystal diode CR and its associated components. Omission of the rectification circuit is justified since the D.C. voltage $E_{dc}$ is a linear function of the magnitude of the developed A.C. voltage $e_{ac}$ produced across the remaining series-parallel network which is depicted in FIGURE 6B simply as a single impedance $R_{ac}$. For purposes of the analysis, moreover, it does not matter whether the output of source 34 is sinusoidal, as may be produced by the crystal oscillator form of the invention to be discussed hereinafter, or whether it approaches a rectangular function such as is produced by the multivibrator embodiment of the invention. The reference voltage function of unit 29 will be considered later in the analysis.

The impedance $Z_L$ (transducer 20) may, for purposes of analysis, be divided into three parallel impedances $Z_a$, $Z_b$ and $Z_c$ (see FIGURE 6B). $Z_a$ corresponds to the basic transducer impedance; $Z_b$ represents the instantaneous impedance value above $Z_a$ due to dielectric variations between the plates of transducer 20; and $Z_c$ represents stray wiring impedance. This division, although somewhat arbitrary, is entirely logical and will facilitate circuit analysis by the loop current method.

Thus, referring further to FIGURE 6B, it will be noted that the A.C. voltage $e_{ac}$ developed across impedance $R_{ac}$ by a current $i(t)$ flowing therethrough may be represented as $$e_{ac} = e_1 + e_2 + e_3$$

where $e_1 = i_1 R_{ac}$; $e_2 = i_2 R_{ac}$; and $e_3 = i_3 R_{ac}$, the component current $i_1$, $i_2$ and $i_3$ being those resulting from flow through the respective branches of impedance $Z_L$.

For any particular periodic voltage function $E(t)$, a rectified voltage $E_{av}$ is proportional to the peak value of said periodic voltage function. Accordingly:

$$E_{av} = k_1(e_{1p} + Ae_{2p} + Be_{3p}) = k_1 e_{1p} + k_2 e_{2p} + k_3 e_{3p}$$

where the $p$ subscripts indicate peak voltages. The values of the weighting functions A and B given in the above equation are determined by the phase relationships of $e_2$ and $e_3$ with respect to $e_1$. For any given installation, voltages $e_1$ and $e_3$ are fixed in magnitude, wherefore B is a constant. Voltage $e_2$, produced across the impedance capacitor $Z_b$ (i.e. the variable portion of the impedance due to dielectric changes therein), is variable in both phase and magnitude; but the phase variation is negligible whereby A may also be considered a constant.

As noted earlier, $E_{dc}$ is directly proportional to the absolute magnitude of $e_{ac}$, and therefore:

$$E_{dc} = k_4 e_{1p} + k_5 e_{2p} + k_6 e_{3p}$$

In short, the D.C. signal voltage may be described as the summation of three voltages. Voltages $k_4 e_{1p}$ and $k_6 e_{3p}$ are constant and are determined by the transducer type and installation; but the voltage $k_5 e_{2p}$ varies, its magnitude being determined by the dielectric constant of the process material.

Summarizing the foregoing discussion, therefore, it will be noted that for a system of the type shown in FIGURES 6A and 6B, various voltages may be produced, some of which are constant and one of which is a variable determined by the dielectric constant of the process material between the plates of the capacitor. It is accordingly possible to apply a counter-voltage which serves to cancel those constant components of the developed voltage, leaving as the only ultimate output voltage that voltage which is developed across the transducer as a result of dielectric variations therein. This counter-voltage is provided by the circuit 29 constituting the source V and the variable resistor $R_a$ already described, whereby the output $E_{dc}$ varies directly as a result of variations in the level of flowing dielectric material between the plates of transducer 20; and whereby, further, the reference level circuit assures that the system may be calibrated to give zero $E_{dc}$ with the transducer empty. In short, when properly calibrated by zero reference circuit 29, the admittance measurement circuit can be adapted to produce a zero output; and will thereafter produce a D.C. signal output directly proportional to the instantaneous value of process material between the capacitor plates for use in actuation of control mechanisms.

Returning now to FIGURES 5A, 5B and 5C, a particular circuit corresponding to the block diagram of FIGURE 3 will be described; and as will appear hereinafter, this circuit incorporates the admittance measurement arrangement already discussed in reference to FIGURES 6A and 6B. The circuit of FIG. 5A includes a conventional power supply 40 constituting an input power transformer T supplied from a line 41 through a fuse F and one pole of a ganged two pole on-off switch 42. Transformer T, as is conventional, includes an output winding $W_1$ providing filament voltages for the power rectifier tube and the multivibrator circuit to be described hereinafter, and also energizing a pilot lamp; and said transformer T further includes an output winding $W_2$ coupled to a full-wave rectifier 43, the output of which is filtered by filter 44 and voltage regulated by regulator tube 45 to provide plate supply for a pair of tubes $V_1$, $V_2$ interconnected as illustrated in a conventional multivibrator circuit operative to product an output variable between 50 and 200 kilocycles under the control of a resolution adjust potentiometer 46. The output of multivibrator $V_1$–$V_2$, which approaches a rectangular waveform, is coupled to the admittance measurement circuit 28; and for purposes of comparing the arrangement shown in FIGURE 5A with that already discussed in reference to FIGURE 6A, like symbols have been employed for the various elements of the measurement circuit. A standby switch 42a is provided and makes inoperative the power supply 40 and, hence, the entire measurement system at such times when it is not in use. Immediate start-up without the customary warm-up period is therefore assured.

The particular admittance measurement circuit shown in FIGURE 5A further includes a series connected resistor 47 and switch 48 coupled across a series connection of the resistor $R_b$ already described and a microammeter 49. Switch 48 and its associated resistor 47 constitute a sensitivity control; and permit resistor $R_b$ to be shunted or not as may be desired, thereby to vary the sensitivity of the admittance measurement portion of the system. Microammeter 49 is provided for calibration purposes and as an aid in setting up the equipment; and in particular may be employed during an initial setup, a switch 50 in the zero adjust circuit is closed (this switch thereafter remaining closed during normal operation of the device), and a coarse adjustment potentiometer 51 and fine adjustment potentiometer 52 (corresponding to the resistor $R_a$ described in FIGURE 6A) may be varied to alter the counter-voltage applied to the admittance measurement portion of the circuit from battery V, until the microammeter 49 registers zero. The on-off switch 42 and standby switch 42a preferably include a pair of blades 53 in series with this zero adjust mechanism and functioning as safety switches to assure that the battery V will not be unduly drained when the equipment is off or on standby, even though switch 50 is closed.

The output of the admittance measurement circuit 28 is coupled via resistor 54 to a pair of terminals 55–56 on a terminal board 57, and thence to the recorder controller 32 (see FIGURE 3); and a further voltage may be coupled to said terminal board 57 between the aforementioned terminal 56 and a further terminal 58, from a compensation function generator 30 (see FIGURE 3) when it is desired to program the signal ultimately applied to unit 32. Resistor 54 is essentially an isolating resistor operative to prevent loading of the measurement circuit by the load impedance of the recorder controller circuit 32.

In order to permit various control functions to be effected, the output leads of the measurement portion of the circuit are coupled to a terminal socket 59, the pins of which are numbered 1–9, as illustrated. The admittance circuit 28 is, as illustrated, coupled to pin 6 in the particular embodiment shown, while the sensing element 20 is coupled to pin 55. When the various control functions to be described hereinafter are not desired, socket 59 can be associated with a plug 60 of the type shown in FIGURE 5C. This plug 60 includes a shorting strap 61 between pins 5 and 6, and when pins 5 and 6 are so shorted, sensing element 20 is connected directly to the admittance portion of the measurement circuit 28 whereby it conforms essentially to the arrangement already described in FIGURE 4.

To permit somewhat more sophisticated control under various conditions of operation, an alternative plug and control arrangement of the type shown in FIGURE 5B may be provided, in which a plug 62 is placed in socket 59; and when so arranged, the system permits periodic checks in the calibration of the instrument and also permits automatic control of the feeding and loading arrangement already described in reference to FIGURE 1.

It will be noted that terminals 5 and 6 of plug 62 are connected respectively to a contact 63 and blade 64 of a switch which is in turn cam-actuated by a "zero check" cam 65. Cam 65 is ganged to a "compensation reset" iam 66 as well as to a "power" cam 67, with said cams 65 through 67 all being driven by a small motor 68 which can, in accordance with the present invention, operate in conjunction with the drive mechanism 33 already described. The cams 66 and 67 will be described hereinafter in relation to their associated switches.

Zero check cam 65 is, as illustrated, so arranged that it tends to move blade 64 from its terminal 63 into contact with a further terminal 68 once during each cycle of control. Under normal conditions op operation, the engagement between blade 64 and contact 63 (as illustrated in FIGURE 5B) closes a circuit between plug and socket terminals 5–6 whereby sensing element 20 is connected to the admittance measurement portion of the circuit in precisely the manner already described with reference to shorting strap 61 in FIGURE 5C. Once during each cycle of operation, however, when cam 65 moves blade 64 away from terminal 63 and into contact with terminal 68, the circuit between terminals 5–6 is broken and a further circuit is completed between terminals 4 and 6. This periodic closure of terminals 4 and 6 causes sensing element 20 to be removed from the circuit and to be replaced by a portion of the reference level circuit comprising capacitors 69, 70 and 71, associated with a reference level switch 72 (see FIGURE 5A).

Capacitors 69 and 70 are preselected so as to exhibit a capacitive reactance equivalent to that of the empty transducer 20 plus strays, capacitor 69 being a trimmer capacitor provided to permit precise adjustment of said equivalent capacitive reactance. When, therefore, the sensing element 20 is removed by operation of cam 65 once during each control cycle (actually at the end of the cycle when the box 24 is completely loaded), an equivalent capacitance is substituted therefor, corresponding to the empty transducer capacitance, wherefore the calibration of the instrument can be detected and corrected periodically.

The capacitor 71 may also be connected into the circuit by switch 72 during the initial calibration of the instrument; and said capacitor 71 is provided to extend the range of the measurement instrument in the manner already described, i.e. to permit dielectric measurement of flowing materials which would normally give an output in excess of five millivolts even though this is the theoretical maximum range of the millivoltage recorder and control circuit 32. As a practical matter, when such extended range is desired, capacitor 71 is placed in the circuit initially, with capacitors 69, 70 and 71 together being employed during the initial zero calibration of the instrument (rather than employing transducer 20 for this purpose); and by the same token, additional capacitors similar to 71 can be added in parallel thereto, to permit multilevel operation operative to extend the range of the instrument even further, such multilevel arrangement being actually shown in FIGURE 9A for the instrument there depicted.

The cam driving motor 68, as illustrated in FIGURE 5B, has its opposing terminals coupled to contacts 1 and 3 of plug 62. The socket 59 in turn has line voltage supplied from points X–Y (corresponding to the line voltage applied to the primary of transformer T) to contacts 1–2 thereof; and also has one side of this line coupled via a manual momentary contact starting switch 72a to contact 3. It will be appreciated that when manual starting switch 72a is open, contacts 1 and 3 on both socket 59 and plug 62 are similarly open, wherefore no power is supplied to the driving motor 68. Upon closure of switch 72a, however, line voltage is applied momentarily across contacts 1 and 3, wherefore motor 68 is energized. Switch blade 73 then moves into contact with contact 74, due to initial movement of cam 67, to close contacts 1 and 2, which hold motor 68 in an energized condition. The system thus commences its normal cycle of operation and will continue by virtue of the power cam-actuated switch blade 73 and contact 74 until such time as power cam 67 disengages switch blade 73. This movement of blade 73 breaks the completed energizing circuit between contacts 1 and 2 and replaces motor 68 across contacts 1 and 3 which, in the absence of other considerations, are open wherefore driving motor 68 stops and the entire system comes to rest.

Contacts 1 and 2 are, as indicated, coupled through motor 68 to a terminal board 75, the terminals of which are in turn led to a remote microswitch 23 comprising the microswitch already discussed with reference to FIGURE 1, i.e. located adjacent the charging box 24. By this arrangement therefore the microswitch 23 can be used to automatically start a new cycle of operation in response to removal of a filled charging box 24 and replacement thereby with an empty charging box; and such operation closes microswitch 23 momentarily and thereby closes contacts 1 and 2, which, as illustrated in FIGURE 5A, are connected directly to the line. Energization of motor 68 then permits another cycle of operation to occur as explained earlier until power cam 67 once more disengages blade 73 whereafter the system again ceases operation.

Compensation reset cam 66, which is also driven by motor 68, cooperates with a further blade 76 movable into and out of engagement with contact 77. Blade 76 and contact 77 are, as illustrated, connected across contacts 7 and 8 of plug 62; and contacts 7 and 8 of socket 59 are in turn connected across terminals 56 and 58 of terminal board 57 (FIGURE 5A), i.e. across the compensation unit connected to terminals 56 and 58. The compensation unit itself will be described subsequently in reference to FIGURE 7 but, by way of anticipation, includes a capacitor which is progressively charged during a compensation operation to provide a programmed output signal adding to the output signal of the admittance meter. Ordinarily this charging operation may occur inasmuch as blade 76 does not engage contact 77, wherefore terminals 7 and 8 of plug 62 and socket 59 are open. However, when compensation reset cam 66 engages blade 76 and moves it into contact with contact 77, terminals 7 and 8 are shorted to one another thereby providing a short circuit across the aforementioned charging capacitor to discharge it rapidly preparatory to a further control cycle.

Summarizing therefore, the operation of FIGURE 5B (which of course corresponds to the timer switch unit 31 of FIGURE 3), it will be noted that motor 68 is just prior to commencement of each production cycle of operation, and for a period of a few seconds, in an energized condition; and for this energized condition, the compensation reset cam 66 shorts out the capacitor in the compensation function generator; zero check cam 65 connects capacitors 69–70 and, depending on the position of switch 72, also capacitor 71 across the admittance meter for initial zero calibration; and power cam 67 and its associated switch serve as a hold device to allow completion of the reset functions.

The reset system may be started by momentary closure of manual switch 72a or remote microswitch 23, whereafter a cycle of operation commences through energization of motor 68. At the completion of the reset cycle, the several cams 65, 66 and 67 move out of engagement with their associated switch blades, motor 68 is de-energized, zero check cam 65 moves away from its blade to connect the sensing transducer 20 across the admittance meter, and compensation reset cam 66 removes the short circuit from the compensation function generator to permit this generator to operate as desired.

A cycle of operation then occurs during which the aforementioned blend feeding of materials and checking of the dielectric constant of the flowing material occurs. At the time that charging box 24 is filled with a desired charge, micro-switch 23 is automatically and momentarily actuated and the cams 65, 66 and 67 simultaneously engage their various switch blades and initiate there set and check actions. Continuous power in therefore supplied to the motor as explained earlier; zero check cam 65 removes the sensing transducer from the the meter circuit and substitutes therefor an equivalent capacitor circuit corresponding to the empty transducer impedance thereby to permit a check of zero calibration and readjustment thereof, if necessary; and the compensation reset cam 66 shorts the capacitor in the compensation function generator to prepare said function generator for a further cycle of operation. This further cycle may in turn be initiated by appropriate actuation of remote microswitch 23 whereafter the same sequence can occur.

The compensation function generator 30, discussed in reference to FIGURE 3 and mentioned in other portions of the preceding discussion, is particularly illustrated in FIGURE 7. As has already been mentioned, the provision of a compensation function generator may be optional; and indeed even in those systems wherein such a generator is provided, it may at times be desirable to remove the function generator from the system without otherwise altering the setup. To his effect therefore a shorting switch can be provided around the compensation function generator; and such a shorting switch has ben designed in FIGURE 3 as switch 30A. It will moreover be appreciated that the particular function generator in FIGURE 7 produces essentially an exponentially varying output voltage which is added to the output voltage of the admittance meter; and in some systems it may be desirable to provide another form of programmed voltage, in which event the particular compensation function generator of FIGURE 7 may be replaced by other function generators producing a desired programmed output.

The function generator of FIGURE 7 constitutes in essence an RC charging circuit producing a voltage which is added to the output of the admittance meter to produce a planned positive dielectric gradient which is built into the charge supplied to box 24 in order either to produce a desired uniformly varying gradient in the final charge, or in order to compensate for any density shifts which may occur during molding techniques and which would tend to cause deviation of the final product from a desired uniform dielectric constant.

The circuit of FIGURE 7 exhibits a relatively long time constant whereby the output of the admittance meter is modified substantially linearly notwithstanding the exponential charging nature of the capacitor in the function generator; and the component values are preferably chosen in accordance with one practical embodiment of the invention to provide a programmed signal over a 2½ minute time base. The function generator itself comprises a voltage source 80 connected across a voltage divider consisting of resistors 81 and 84, and through resistor 82 to one end of a capacitor 83. The other end of capacitor 83 is coupled to said charging source 80 through a portion of said resistor 84, which comprises a rheostat operating as an adjustment mechanism permitting the actual charging rate of capacitor 83 to be varied within limits as desired. The varying output voltage produced across capacitor 83 appears at terminals 85 and 86; and it will be appreciated that these terminals 85 and 86 would in turn be connected to terminals 56 and 58 on terminal board 57 (FIGURE 5A).

A shorting switch 87 is schematically shown across capacitor 83 for selectively discharging the capacitor; and this shorting switch, it will be appreciated, corresponds to the terminals 7 and 8, with the associated switch operated by compensation reset cam 66, as already described.

One final feature of the system thus far described should be noted. Inasmuch as the system is employed, in the particular embodiment described, in a precision control apparatus, it is desirable that the stability of the entire system be rendered insensitive to temperature variations insofar as that may be possible. Accordingly, as a further refinement, the arrangement of FIGURE 5, for example, should be housed within a temperature controlled cabinet; and a thermostat 88 coupled via terminal board 89 to heater circuit 90 may be provided to maintain the temperature adjacent the instrument substantially constant. A temperature variance not in excess of five degrees is advisable.

The arrangements thus far described utilize, of course, a multivibrator source in the measurement circuit. However, variations may be made in such arrangements; and FIGURES 8 and 9A, 9B show one such possible modification. Referring first to FIGURE 8, it will be seen that (comparing said figure with FIGURE 4) the modified circuit in essence replaces multivibrator 34 by a crystal oscillator 91 having a cathode follower output 92, the other elements of the circuit being the same as and operating essentially similarly to those already described in reference to FIGURE 4 et seq. An actual schematic of this alternative arrangement is shown in FIGURE 9A; and for the most part the circuit corresponds directly to the circuit already described in reference to FIGURE 5A wherefore this description will not be repeated. The particular oscillator 91 shown in FIGURE 9A is a commercially available type comprising one designated E. F. Johnson No. 250–28, 100 kc. crystal controlled oscillator. The output of the oscillator is, as illustrated, taken across a potentiometer in the cathode circuit of cathode follower 92 with this potentiometer 93 constituting a resolution adjustment.

The cathode follower 92 is provided to present a proper impedance level for coupling of signals to the admittance measuring portion of the circuit; and also permits the aforementioned desired resolution adjustment to be accomplished, whereby the output number of millivolts per unit of dielectric constant being measured can be varied within limits. The admittance measuring portion of the circuit is the same as, and operates the same as, the system already described in reference to FIGURE 5A; and accordingly, like numerals have been employed throughout. Similarly, the resistive portion of the zero adjust circuit also corresponds to that described in reference to FIGURE 5A, with the exception that the switch 50 of FIGURE 5A is not provided, the switching function being entirely accomplished by the switch blade portion 53 of the main on-off switch 42.

The essential distinction between the circuits of FIGURES 5A and 9A, other than the change of the multivibrator source to a crystal controlled oscillator source having a cathode follower output, resides in certain simplification of the auxiliary control, i.e., the timer switch unit corresponding to 31; and such simplification can be effected when a crystal controlled arrangement such as that shown in FIGURE 9A is employed, due to the inherent greater stability of a crystal controlled oscillator.

Thus, referring to FIGURES 9A and 9B, it will be seen that the zero check cam 65 (FIGURE 5B) and its associated components, can be completely eliminated; and once the system has been initially calibrated it has been found to remain in good calibration, particularly when temperature is controlled by a heater circuit of the type already described. To permit such initial calibration, a manual switch 94 is provided so that the sensing element 20 may be replaced by a number of capacitors essentially similar to capacitors 69, 70 and 71 of FIGURE 5A; and this portion of the reference level switch in the arrangement of FIGURE 9A includes a pair of capacitors 95 and 96 cooperating with a switch 97, rather than the single capacitor 71 cooperating with switch 72 as shown in FIGURE 5A, whereby further range extension can be effected and three-level operation rather than the two-level operation of FIGURE 5A can be produced.

For purposes of further simplification, the manual start switch 72a of FIGURE 5A has been also eliminated, whereby the cam driving motor 68a of FIGURE 9B is selectively started by appropriate manipulation of a switch connected to terminal board 75a; and energization of the motor 68a causes operation of power cam 67a and a compensation reset cam 66a, in a manner directly analogous to that already described in reference to FIGURE 5B.

Even further simplification of the circuit may, of course, be effected when it is desired to use the admittance meter for general purpose measurements; and in such a further simplified circuit the plug and jack arrangement, as well as the association timer switch controls, can be entirely eliminated, as can the capacitive portion of the zero adjust circuit which is employed for initial calibration. The sensing element 20 can in such an alternative arrangement be permanently connected directly to the admittance measurement portion of the circuit whereby the resultant meter would constitute, in the embodiment of FIGURE 9A, the power supply portion thereof, oscillator 91, cathode follower 92, the admittance measurement portion 28, and the resistive adjustment portion of the circuit designated "zero adjust." Indeed, in this alternative embodiment, the resolution adjustment potentiometer 93 can be further eliminated and the cathode follower output coupled directly to the admittance measurement portion of the circuit 28.

While I have thus described preferred embodiments of the present invention, many variations will be suggested to those skilled in the art, and certain of these variations have already been described. Other variations are possible, however, and it must therefore be emphasized that the foregoing description is meant to be illustrative only and should not be considered limitative of my invention. All such variations and modifications as are in accord with the principles described, are meant to fall within the scope of the appended claims.

Having thus described my invention, I claim:

1. In an apparatus for effecting dynamic level control of a first dielectric material flowing along a predetermined path, the combination comprising a capacitive transducer disposed along said predetermined path and comprising a plurality of capacitor plates through which said dielectric material flows, a first movable gate structure adjacent said transducer mounted for movement in directions transverse to the flow direction of said dielectric material, admittance measurement means coupled to said transducer for giving an electrical output characteristic of the depth of said flowing dielectric material between said plates, control means responsive to the output of said admittance measurement means for varying the position of said first gate structure thereby to vary the depth of said flowing dielectric material between said plates, means supplying a second dielectric material flowing along a further path intersecting said predetermined path at a position downstream of said transducer whereby said second dielectric material dilutes said first dielectric material after said first dielectric material has flowed through said transducer, a second gate structure for varying the depth of said second dielectric material as it flows along said further path toward said intersecting position, and means for varying the position of said second gate structure in inverse relation to variations in the position of said first gate structure.

2. The combination of claim 1 wherein said first gate structure is disposed upstream of said transducer.

3. The combination of claim 1 including auxiliary voltage generator means coupled to said control means for modifying the electrical input to said control means from said admittance measurement means in accordance with a predetermined program.

4. The combination of claim 3 including means coupled to said auxiliary generator means for periodically resetting said auxiliary generator means to a predetermined voltage thereby to recommence said program.

5. An apparatus for effecting dynamic level control of a granular dielectric material flowing along a predetermined path to a discharge point, the combination comprising a transducer disposed adjacent said path and comprising a plurality of elongated capacitor plates through which said granular material passes, said capacitor plates being disposed in side-by-side relation to one another with their directions of elongation extending along the direction of flow of said granular dielectric material, at least the leading edges of said plates being contoured to minimize disturbances in the flow of said material between said plates, flow control means disposed adjacent said contoured leading edges of said plates for varying the depth of said granular material as it passes toward and thence between said plates, measurement means coupled to said transducer for giving a continuous electrical output continuously indicative of the instantaneous depth of said granular dielectric material between said plates, and means responsive to the output of said measurement means for adjusting said flow control means to vary the depth of said dielectric material between said plates thereby to vary the total quantity of said granular dielectric material which passes to said discharge point in a predetermined time interval.

6. The combination of claim 5 including timing means for halting flow of said dielectric material upon elapse of said predetermined time interval.

7. The combination of claim 6 including calibration means coupled to said measurement means, said timing means including means for rendering said calibration means operative during halting of the flow of said dielectric material whereby said measurement means may be recalibrated during time periods intermediate successive ones of said predetermined time intervals.

8. In an apparatus for effecting dynamic level control of a moving granular dielectric material, the arrangement including a capacitive transducer comprising a plurality of capacitor plates through which said moving dielectric material passes, a movable plate comprising a gate structure disposed adjacent said transducer for controlling the depth of said granular material as it passes between said capacitor plates, admittance measurement means coupled to said transducer for giving an electrical output characteristic of the instantaneous depth of said dielectric material between said plates, means responsive to the output of said measurement means for varying the position of said plate thereby to control the total quantity of said dielectric material which passes through said plates in a given time interval, and means for mixing said dielectric material with a further diluent granular dielectric material supplied in inverse proportion to the quantity of said first mentioned material which has passed through said plates.

9. The arrangement of claim 8 wherein said movable plate is disposed closely adjacent the upstream end of said transducer.

10. An apparatus for controlling the final dielectric constant of an article formed, at least in part, from a granular dielectric material moving along a predetermined path to a collection point having a replaceable collection receptable disposed adjacent thereto, comprising a capacitive transducer disposed along said path upstream of said receptacle, said transducer comprising a plurality of capacitor plates through which said dielectric material passes, measurement means coupled to said transducer, and including an admittance measurement circuit of which said transducer forms a part, for giving an electrical output characteristic of the depth of said dielectric material as it passes between said plates, means responsive to the output of said measurement means for selectively varying and controlling the depth of said dielectric material thereby to vary the total quantity of said controlled depth granular material which passes to said collection receptacle, and control means adjacent said collection receptacle for selectively initiating operation of said measurement means in response to removal of a substantially filled collection receptacle and replacement thereof with a substantially empty receptacle.

11. In an apparatus for controlling the dielectric constant of an article prepared by accumulation of a flowing dielectric material, the arrangement including a capacitive transducer comprising a plurality of plates disposed along the flow path of said material, said material flowing between said plates, an admittance measurement circuit comprising an energization source, a load impedance, said source being coupled to said load impedance and said transducer connected in series with one another, whereby the voltage effected by said energization source across said load impedance varies with variations in the capacitive impedance of said transducer, means providing a source of reference voltage characteristic of a desired dielectric constant for said article, means comparing the voltage across said load impedance with said reference voltage, and control means responsive to said comparing means for selectively altering the rate of flow of said flowing dielectric material between said plates.

12. The arrangement of claim 11 wherein said control means includes means operative to vary the depth of said flowing dielectric material between said plates.

13. The arrangement of claim 12 including auxiliary control means for progressively varying said depth of flowing dielectric material in accordance with a predetermined program.

14. The arrangement of claim 13 wherein said auxiliary control means includes a capacitor, means progressively charging said capacitor, means coupling said capacitor to the input of said comparing means, and means for periodically discharging said capacitor to reinitiate said programmed depth variation.

15. In an apparatus for controlling the dielectric constant of an article prepared by accumulation of a flowing granular dielectric material, a capacitive transducer disposed along the flow path of said granular material, an admittance measurement circuit coupled to said transducer and including means producing a signal which varies with instantaneous variations in the capacitive impedance of said transducer due to instantaneous variations in the rate of flow of said material past said transducer, a source of reference potential, comparison means for comparing said signal with said reference potential to produce an error signal, movable gate means disposed adjacent said transducer transverse to the flow path of said material, and means responsive to said error signal for varying the position of said gate means and thereby the depth of said flowing granular material so as to control the rate of flow of said flowing dielectric material past said transducer.

16. In an apparatus for producing a signal output related to a primary variable constituting a determinable function of dielectric constant, a capacitive transducer comprising a plurality of plates between which a dielectric material, constituting said primary variable, is placed, a measurement circuit including a radio frequency signal generation source, a substantially fixed magnitude load impedance connected in series with said transducer across said source to form a measurement circuit which is non-resonant at the frequency of said source for all anticipated magnitudes of said primary variable, and counter-voltage means coupled to said load impedance for impressing a voltage across said load impedance substantially equal in magnitude and opposite in sense to increments of voltage produced across said load due to current flow through stray wiring capacitances between said transducer and measurement circuit as well as due to current which would flow through said transducer in the absence of said dielectric material, whereby the resultant voltage produced across said load impedance by said signal generation source and said counter-voltage means varies substantially solely as a function of the dielectric constant of said dielectric material.

17. An apparatus for producing a signal output related to the dielectric constant of an article comprising a capacitive transducer having a plurality of plates between which said article is placed, a measurement circuit including a radio frequency signal generation source, a substantially fixed load impedance connected in series with said transducer across said source to form a measurement circuit which is non-resonant at the frequency of said source for all anticipated dielectric constants of said article, and means coupled to said load impedance for impressing a compensating voltage across said load impedance substantially equal in magnitude and opposite in sense to increments of voltage produced across said load by current flow therethrough due to circuit parameters in said measurement circuit other than those varying substantially solely as a function of the dielectric constant of said article.

18. An admittance measurement circuit for producing a signal output related to a primary variable constituting a determinable function of dielectric constant, comprising a capacitive transducer having a plurality of plates between which a dielectric material may be placed, a signal generation source, fixed load means connected in series with said transducer across said source to form a non-resonant measurement circuit at all anticipated values of said primary variable, counter-voltage means for impressing a voltage across said load means substantially equal in magnitude and opposite in sense to increments of voltage produced across said load means due to at least that current which would flow through said transducer in the absence of said dielectric material, whereby the resultant voltage produced across said load means by said signal generation source and said counter-voltage means varies substantially solely as a function of the dielectric constant of said dielectric material, a capacitive circuit having a reactive impedance preselected to correspond to the reactive impedance of said transducer absent any of said dielectric material, and switch means for substituting said capacitive circuit for said capacitive transducer thereby to permit calibration of said measurement circuit for an empty transducer condition notwithstanding presence of said dielectric material between the plates of said transducer.

19. An apparatus for measuring the dielectric constant of an article comprising a capacitive transducer having plate means adjacent which said article may be placed, fixed load means connected to said transducer to form a non-resonant measurement circuit at all anticipated dielectric constants of said article, signal means for energizing said interconnected transducer and load means, means for impressing a voltage across said fixed load means substantially equal in magnitude and opposite in sense to increments of voltage produced across said load means by current flow therethrough due to circuit parameters other than those varying substantially solely as a function of the dielectric constant of said article, and control means for replacing said transducer by an equivalent capacitive means thereby to permit calibration of said apparatus notwithstanding the presence of said article adjacent said transducer plate means.

20. The apparatus of claim 19 wherein said control means comprises timing means automatically replacing said transducer by said equivalent capacitive means thereby to permit periodic such calibrations.

21. An apparatus for measuring the dielectric constant of a dielectric material comprising a capacitive transducer having plate means adjacent which said material may be placed, fixed load means coupled to said transducer, high frequency signal means for energizing both said transducer and load means, said capacitive transducer exhibiting a capacitive reactance at the frequency of said signal means which capacitive reactance may vary within a predetermined range in dependence upon the dielectric constant of said material, said interconnected transducer and load means being non-resonant at the frequency of said signal means throughout said predetermined range, means for impressing a voltage across said load means substantially equal in magnitude and opposite in sense to increments of voltage produced across said load means by current flow therethrough due at least to the parameters of circuit components coupling said transducer to said load means, and output means coupled to said load means for monitoring the resultant voltage across said load means.

References Cited in the file of this patent

UNITED STATES PATENTS

| | | |
|---|---|---|
| 1,889,663 | Ilyus | Nov. 29, 1932 |
| 2,519,668 | Konigsberg | Aug. 22, 1950 |
| 2,540,146 | Stober | Feb. 6, 1951 |
| 2,637,434 | Harper | May 5, 1953 |
| 2,909,303 | Henderson et al. | Oct. 20, 1959 |

UNITED STATES PATENT OFFICE
CERTIFICATE OF CORRECTION

Patent No. 3,149,650

September 22, 1964

Robert L. Horst

It is hereby certified that error appears in the above numbered patent requiring correction and that the said Letters Patent should read as corrected below.

Column 3, line 74, for "stil" read -- still --; column 9, line 7, for "product" read -- produce --; line 31, after "initial" insert -- setup procedure, when transducer 20 is empty. For this initial --; line 64, for "55" read -- 5 --; column 10, line 10, for "iam" read -- cam --; line 19, for "op" read -- of --; column 12, line 13, for "ther set" read -- the reset --; same line 13, for "in" read -- is --; line 18, after "of" insert -- the --; line 34, for "his" read -- this --; line 37, for "ben" read -- been --; column 13, line 18, before "heater" insert -- a --; column 14, line 23, for "association" read -- associated --.

Signed and sealed this 19th day of January 1965.

(SEAL)
Attest:

ERNEST W. SWIDER
Attesting Officer

EDWARD J. BRENNER
Commissioner of Patents